United States Patent
Shenoy et al.

(10) Patent No.: US 7,602,717 B1
(45) Date of Patent: Oct. 13, 2009

(54) EFFICIENT USE OF MULTIPLE PORT INTERFACES AVAILABLE ON A NETWORK DEVICE SUPPORTING ATM

(75) Inventors: Sudhakar Shenoy, Bangalore (IN); Balaji Lakshmikanth Bangolae, Bangalore (IN); Hrishikesh Vishwas Kulkarni, Bangalore (IN); Amit S. Phadnis, Bangalore (IN); Shoou Jiah Yiu, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1348 days.

(21) Appl. No.: 10/310,029

(22) Filed: Dec. 5, 2002

(51) Int. Cl.
  *G08C 15/00* (2006.01)
  *H04L 12/28* (2006.01)
  *G06F 9/46* (2006.01)
(52) U.S. Cl. .................. 370/235; 370/397; 718/105
(58) Field of Classification Search ......... 370/216–220, 370/235, 237, 238, 238.1, 397, 395.52, 400, 370/401; 718/104, 105; 709/220, 221, 249
See application file for complete search history.

(56) References Cited

U.S. PATENT DOCUMENTS

| | | | | |
|---|---|---|---|---|
| 5,844,887 A * | 12/1998 | Oren et al. | ................. | 370/218 |
| 5,872,786 A * | 2/1999 | Shobatake | .................. | 718/104 |
| 5,943,338 A * | 8/1999 | Duclos et al. | .......... | 370/395.65 |
| 5,959,972 A * | 9/1999 | Hamami | ..................... | 370/228 |
| 5,987,526 A * | 11/1999 | Morales | ...................... | 370/401 |
| 7,139,276 B1 * | 11/2006 | Sitaraman et al. | ........... | 718/105 |
| 2007/0242679 A1 * | 10/2007 | Meggison et al. | ........... | 370/397 |

OTHER PUBLICATIONS

J. Postel; Entitled, "Request for Comments: 791-Internet Protocol—DARPA Internet Program Protocol Specification"; Sep. 1981; available from www.ietf.org; (49 Pages).

* cited by examiner

*Primary Examiner*—Aung S Moe
*Assistant Examiner*—Kerri M Rose
(74) *Attorney, Agent, or Firm*—Patent Capital Group

(57) ABSTRACT

Moving a virtual circuit from one port interface to another when multiple port interfaces are present between two network devices. Such a move may be performed, for example, when a port interface fails or when needed to balance the load (e.g., aggregate amount of bandwidth of all virtual circuits presently assigned to a port interface) across multiple port interfaces. As a result, the port interfaces may be used efficiently.

45 Claims, 6 Drawing Sheets

US 7,602,717 B1

EFFICIENT USE OF MULTIPLE PORT INTERFACES AVAILABLE ON A NETWORK DEVICE SUPPORTING ATM

BACKGROUND OF THE INVENTION

1. Field of the Invention

The present invention relates to telecommunication networks, and more specifically to a method and apparatus for efficiently using multiple port interfaces available on a network device supporting asynchronous transfer mode (ATM).

2. Related Art

Virtual circuits are often provisioned between network devices using asynchronous transfer mode (ATM) technology/standards as is well known in the relevant arts. Once provisioned, the virtual circuits generally transfer cells containing data related to user applications. The transfer of data enables communication between various user applications as is also well known in the relevant arts.

Network devices often contain a port interface enabling connection to an adjacent network device. The port interface generally contains associated hardware, software and/or firmware, to enable data to be transferred (sent and received) on a communication path to the adjacent network device.

A network device may contain multiple port interfaces, which are all connected to the same adjacent device using corresponding connection paths. Such multiple interfaces and paths may be provided for several reasons, as is well known in the relevant arts. It is generally desirable that available port interfaces be used efficiently (e.g., increased reliability or balancing load on the port interfaces).

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

According to an aspect of the present invention, when a first interface and a second interface are provided to connect to the same adjacent network device, a virtual circuit assigned to a first port interface is moved to a second port interface. In one embodiment, such a move occurs when the first interface fails. Due to such a move, user applications may continue to successfully continue to send and receive data on the virtual circuit even after the first port interface is determined to have failed. Accordingly, the availability of the virtual circuits may be continued after the failure of the first port interface. A virtual circuit may be moved for achieving other objectives such as load balancing on port interfaces, etc.

In an embodiment described below, when multiple port interfaces are provided to the same adjacent network device, all the port interfaces together are viewed as a cluster group. Such a grouping may exist in the adjacent network device as well. Virtual circuits may be provisioned between cluster groups (of different network devices). When a port interface fails, transparent to the operation of user applications, virtual circuits on the failed port interface may be moved to another port interface in the logical group. Such a move may be implemented, for example, using the approaches described below in greater detail.

According to another aspect of the present invention, a discovery protocol may be employed to enable a network device to determine the specific port interface to which a virtual circuit is assigned.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
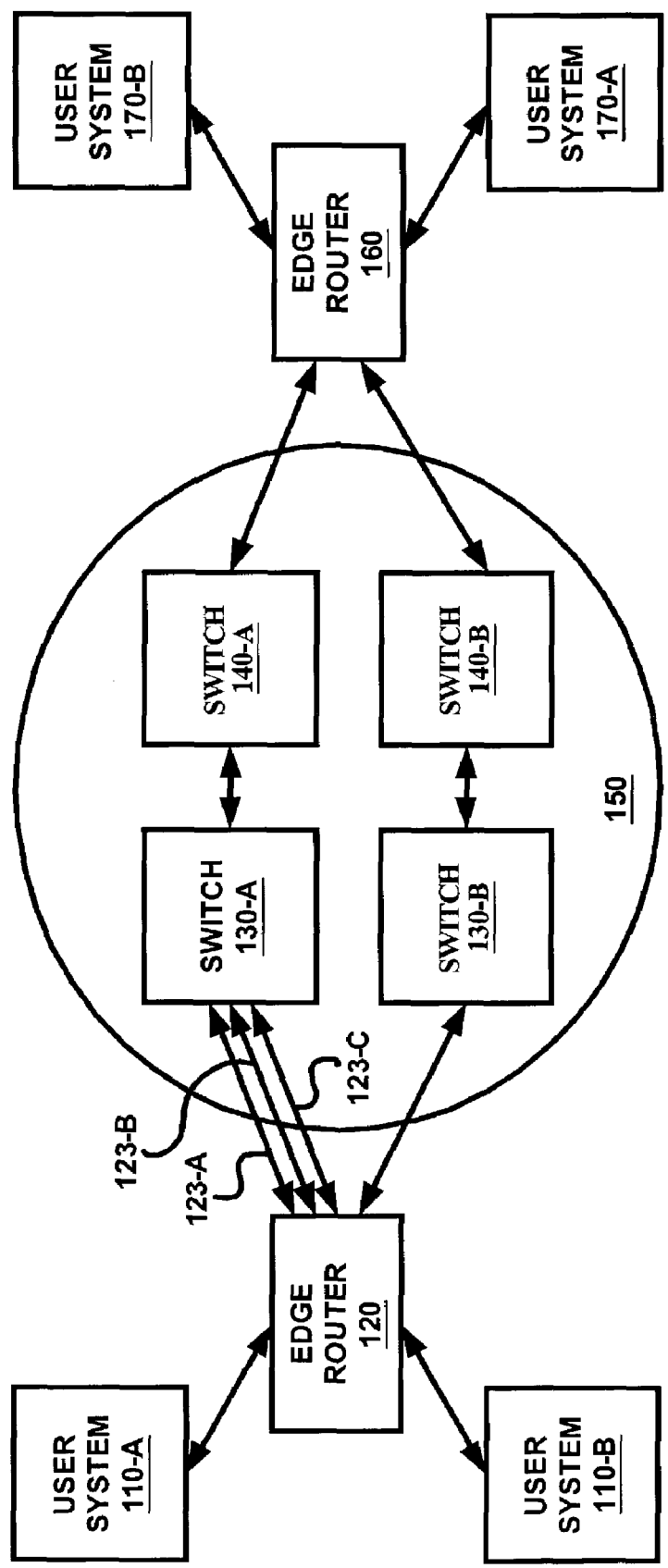
FIG. 1 is a block diagram illustrating an example environment in which the present invention can be implemented.

FIG. 1 is a block diagram illustrating an example environment in which the present invention can be implemented. The environment is shown containing user systems 110-A, 110-B, 170-A and 170-B, edge routers 120 and 160, and switches 130-A, 130-B, 140-A and 140-B. The switches are shown contained within ATM backbone 150. Each component is described below in further detail.

The environment is shown containing a few representative components only for illustration. In reality, each environment typically contains many more components. In addition, for conciseness and clarity, the invention is described with reference to edge router 120 and switch 130-A only. However, several aspects are applicable to other edge routers and switches (in general, network devices) as well.

User systems 110-A, 110-B communicate with user (or target) systems 170-A and 170-B using ATM backbone 150. Each user system (e.g., 110-A) interfaces with the connected (e.g., user system 110-A is shown connected to edge router 120) edge router(s) using a layer 3 protocol such as Internet Protocol (IP). Each user system may correspond to a computer system or workstation, and can be implemented in a known way.

ATM backbone 150 is shown containing switches 130-A, 130-B, 140-A and 140-B, which provide different physical paths between edge routers 120 and 160. The switches operate consistent with the ATM protocol. In general, switches enable edge routers 120 and 160 to communicate with each other using ATM protocol.

Edge router 120 interfaces with user systems 110-A and 110-B using IP protocol (an example of a layer-3 protocol), and with switch 130 using ATM (layer-2 protocol). Edge router 120 is shown connected to switch 130-A using multiple parallel paths 123-A through 123-C. A single port interface is generally provided on each of the paths, and accordingly the port interfaces and communication paths are interchangeably referred by the reference numerals 123-A through 123-C.

An aspect of the present invention enables such multiple port interfaces to be used efficiently. For illustration, the description of below is provided substantially with reference to moving a virtual circuit in response to failure of a presently assigned port interface. However, the move may be performed for various other reasons such to dynamically balance the load on the interfaces. The manner in which example embodiments can be implemented is described below in further detail.

3. Method

Figure 2B:
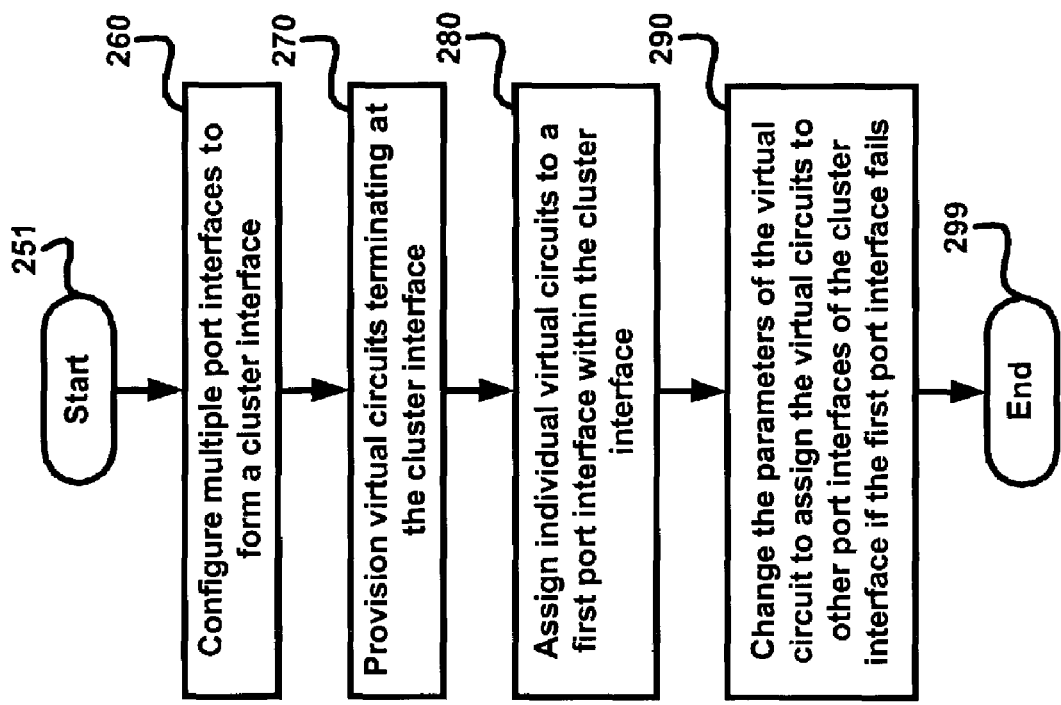
FIG. 2B is a flow chart illustrating the manner in which a virtual circuit can be moved from one port interface to another in an embodiment of the present invention.
Figure 2A:
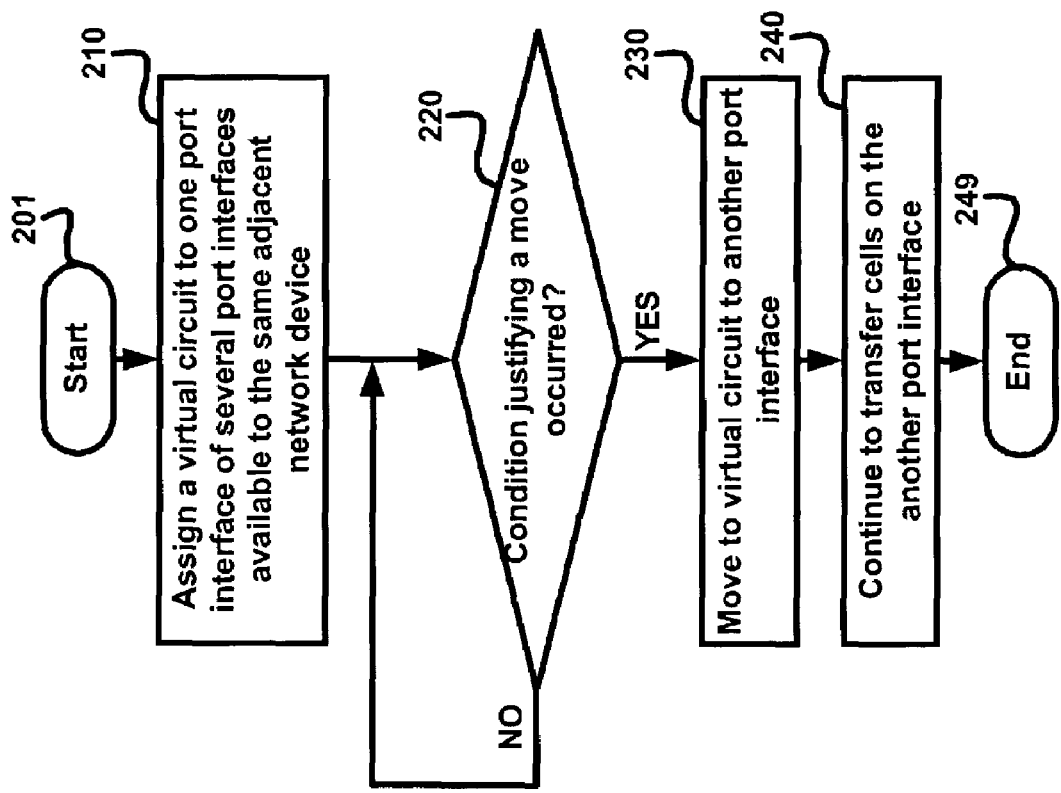
FIG. 2A is a flow chart illustrating the manner in which a virtual circuit can continue to operate even if a port interface (on which the virtual circuit) is provided fails in an embodiment of the present invention.

FIG. 2A is a flow-chart illustrating a method in accordance with the present invention. The method is described with reference to edge router 120 of FIG. 1 for illustration only. However, the method can be implemented in other network devices and environments also, and such implementations are contemplated to be within the scope and spirit of several aspects of the present invention. The method starts in step 201, in which control immediately passes to step 210.

In step 210, a virtual circuit is assigned to one of the three port interfaces 123-A through 123-C. Various criteria such as number of virtual circuits assigned to each port interface, the bandwidth available on communication path connecting to each port interface, and the aggregate bandwidth of the virtual circuits already assigned to a port interface, may be used in selecting the specific port interface to which to assign the virtual circuit. For illustration, it is assumed that the virtual circuit is assigned to port interface 123-A.

In step 220, edge router 120 determines whether a condition justifying the move of a virtual circuit (from a presently assigned port interface) has occurred. An example of such a condition is the failure of the presently assigned port interface/communication path. The failure may be determined based on various pieces of information available within edge router 120 and/or based on protocols such as OAM.

Another such condition is to balance load on various port interfaces (to the same device 130-A). For example, in DSL type environments, many of the active virtual circuits may be provided on one port interface, while very few are provided on another port interface. To balance the load (or for better throughput performance), it may be determined to move a virtual circuit from one port interface to another. If the condition has occurred, control passes to step 230, or else control remains in step 220.

In step 230, the virtual circuit is moved to operate from another port interface (e.g., 123-B). In general, the virtual circuit needs to be moved such that the change is transparent to the operation of user applications transferring data on the virtual circuit. In step 240, data may be sent and received on the virtual circuit after the move is complete. The description is continued with reference to an example implementation which allows the virtual circuit to be moved.

4. Moving the Virtual Circuit

FIG. 2B is a flow-chart illustrating the details of an example approach allowing a virtual circuit to be moved from one port to another. The method is described with reference to edge router 120 of FIG. 1 for illustration only. However, the method can be implemented in other network devices and environments also, and such implementations are contemplated to be within the scope and spirit of several aspects of the present invention. The method starts in step 251, in which control immediately passes to step 260.

In step 260, edge router 120 is configured such that multiple port interfaces form a cluster interface. In other words, the cluster interface represents a logical grouping of port interfaces on which virtual circuits can be moved from one port interface to another. For illustration, it is assumed that all the three port interfaces 123-A through 123-C are configured to form a cluster interface, even though only a subset of the available port interfaces (e.g., only 2 of the 3 port interfaces) can be configured to be part of the cluster interface between two adjacent network devices (edge router 120 and switch 130-A in this example).

In step 270, virtual circuits are configured to terminate at the cluster interface. The virtual circuits can be either permanent virtual circuits or switched virtual circuits (configured using signaling protocols). In step 280, each individual virtual circuit is assigned to one of the port interfaces within the cluster interface (at which the virtual circuit terminates). Some implementation considerations are described in sections below when assigning the virtual circuits to individual specific ports.

In step 290, the parameters controlling the operation of a virtual circuit are changed such that the virtual circuit would be assigned to a new port interface once a presently assigned port interface is determined to have failed. Once the virtual circuit is assigned to a new port interface, data may be continued to be transferred as noted above with reference to step 240 above. The description is continued with reference to some consideration while implementing various features noted above.

5. Implementation Considerations

In one embodiment, the VPI/VCI combination values are maintained to be unique throughout a cluster interface such that the same VPI/VCI value can be used even if a virtual circuit is re-assigned to different port interfaces within the same cluster. Such a feature may simplify the implementations.

According to another aspect of the present invention, the assignment of port interfaces is always performed by one of the two adjacent network devices. With reference to FIG. 1, edge router 120 may perform (instead of switch 130-A) the assignment of each virtual circuit to a specific one of the three port interfaces 123-A through 123-C. By delegating the assignment task to only one of the two adjacent network devices, conflicting port assignments may be avoided.

According to one more aspect of the present invention, a 'discovery protocol' is implemented between the two adjacent devices. The discovery protocol enables the communication of the specific port interface to which a virtual circuit is assigned. The protocol may contain a request and response combination. The request may need to specify the specific virtual circuit (VPI/VCI) for which information on port assignment is sought. The response may accordingly indicate the specific port interface to which the virtual circuit is assigned.

According to one convention, a port interface may be part of only one cluster interface. A request (or a response) received on a port interface may be deemed to be related to only a cluster interface containing the port interface. By further maintaining the VPI/VCI unique within a cluster interface, the processing of requests and responses may be simplified.

Edge router 120 may be designed to send response messages 'voluntarily' (i.e., without waiting for a request) soon after a virtual circuit is assigned to a port interface and switch 130 may be designed to process such responses also. In general, once the specific port interface to which a virtual circuit is assigned is known, switch 130 is configured to process packets on the corresponding port interface.

The request and response may be implemented using OAM cells and/or ILMI protocol, well known in the relevant arts. OAM is described in further detail in ITU-T Recommendation I.610 entitled, "Series I: Integrated Services Digital Network—Maintenance principles B-ISDN operation and maintenance principles and functions", and ILMI protocol is described in further detail in a document entitled, "Integrated Local Management Interface (ILMI) Specification, Version 4.0", Document Number: af-ilmi-0065.000, available from www.atmforum.com. The two documents are incorporated in their entirety herewith.

In addition, edge router 120 may maintain information ("grouping information") indicating the specific port interfaces, which are to be treated as a cluster interface. The grouping information may be specified by an administrator. The grouping information is used when a virtual circuit is to be moved from one port interface to another.

Also, it may be desirable that the movement of a virtual circuit across port interfaces be transparent to the operation of user applications transferring data on the virtual circuit. The manner in which such transparency may be attained is described below.

6. Transparency to User Applications

In one embodiment operating in the context of asynchronous transfer mode (ATM), IP routing is designed to operate interfacing with the cluster interfaces, and the re-binding (configuring to transmit/receive data after a move) of a virtual circuit to a new port interface is achieved by changing the virtual circuit specific parameters as described below.

In such an approach, when an IP packet is received from user system 110-A, a forwarding table is searched based on the destination IP address of the IP packet to determine the output interface represented by Software Interface description block (SWIDB) and a next hop IP address. One of the fields in the SWIDB indicates whether the SWIDB belongs to a cluster interface (containing several individual port interfaces) or an individual port interface. Another field indicates whether the packet is to be forwarded on a point-to-point or multi-point (e.g., a sub-net of addresses accessible on different VCs) connection.

Assuming for now that the SWIDB indicates that it is a part of a cluster interface, and the virtual circuit is provisioned to support a point-to-point IP connection, the SWIDB may contain a virtual circuit descriptor (VCD). The VCD in turn uniquely identifies a VC-structure, which uniquely identifies a virtual circuit. As described below, the VC structure is used to determine the specific port interface to forward the cells formed from the IP packet.

In the case of a sub-network type IP connection, the next hop IP address resulting from the route-table lookup is again used to search a IP-to-VC table, which points to a VC structure for the virtual circuit transporting packets destined to the IP address. In an embodiment, a IP-to-VC table is maintained associated with each cluster interface. As an illustration, a packet destined to user system 170-B, may cause the forwarding table to be generate the IP address of edge router 160. The IP address of the edge router causes IP-to-VC table to identify a VC-structure of a virtual circuit destined to edge router 160.

Each VC-structure may contain the VPI/VCI pair to be used associated with cells transmitted on the virtual circuit. In addition, each VC-structure may in turn point to a physical IDB (PIDB), which uniquely identifies a port interface. In addition, a PIDB may contain various parameters (QOS, buffer lengths, etc.), which determine the manner in which cells from various virtual circuits are transmitted on the physical interface. Thus, all the information necessary to transmit IP packets on ATM network 150 may be available from the various data pieces noted above.

From the above, it may be appreciated that to move a virtual circuit from one port interface to another (new port interface), the VC-structure corresponding to a virtual circuit may need to be modified to point to a PIDB corresponding to the new port interface. Accordingly, a network device may be need to be designed to perform necessary re-configurations to effect the desired re-binding when a port interface fails.

In addition, the necessary configurations may need to be performed to set up the virtual circuit on the new port interface to which the virtual circuit is to be moved. Such setting up may be necessary both when a virtual circuit is provisioned initially on one of the port interfaces, and when the virtual circuit is moved to a new interface. The setup operation generally depends on the implementation of the specific network device and will be apparent to one skilled in the relevant arts.

The approach of above may operate in conjunction with port interfaces not provided as a part of a cluster interface. In such a situation, for both point to point interface and multi-point interface, a pointer to PIDB may be provided within SWIDB itself. A VC-structure may also be provided to specify VPI/VCI type related information, and the VC structure to be used for each IP packet may be determined similar to in the case of cluster interface described above. The manner in which example network devices can be implemented using some of the above-noted approaches is described below with examples.

7. Edge Router

Figure 3:
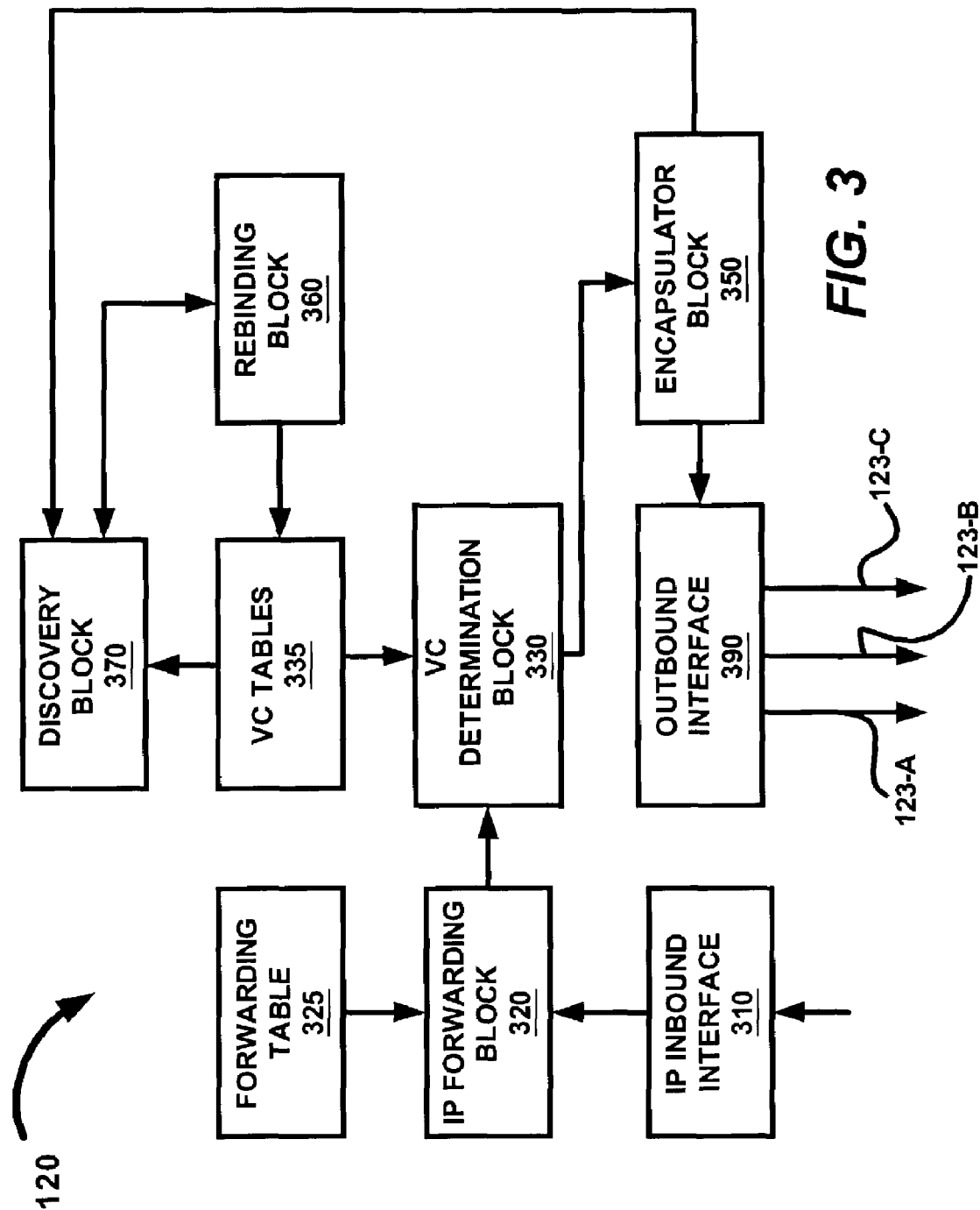
FIG. 3 is a block diagram illustrating the details of an edge router in an embodiment of the present invention.

FIG. 3 is a block diagram illustrating the details of an embodiment of edge router 120 as relevant to several aspects of the present invention. Edge router 120 is shown containing IP inbound interface 310, IP forwarding block 320, VC determination block 330, encapsulator 350, re-binding block 360, discovery block 370, and outbound interface 390. Each component is described below in further detail.

IP inbound interface 310 provides the physical, electrical and other protocol interfaces to receive layer-3 (IP) packets from user systems 110-A and 110-B. The packets are forwarded to IP forwarding block 310. Similarly, outbound interface 390 provides the physical, electrical and protocol interfaces to transmit IP packets in the form of ATM cells on the virtual circuits between edge routers 120 and 160. IP inbound interface 310 and outbound interface 390 may be implemented in a known way.

IP forwarding block 320 receives an IP packet from IP inbound interface 310, and determines an IP route the packet is to be forwarded on. The destination IP address is compared ("look-up") against entries in forwarding table 325 to determine the manner in which an IP packet is to be forwarded. Broadly, when a next-hop machine is connected indirectly (e.g., by a ATM network, as shown in FIG. 1), the look-up may provide an identifier of a sub-interface (represented by SWIDB) and a next hop IP address. The IP address is used to determine the specific virtual circuit to forward the packet on. In the case of point-to-point interfaces, the virtual circuit is determined directly from the outgoing sub-interface (SWIDB in the above example). Forwarding table 325 may be populated using routing protocols and/or manually in a known way.

VC table 335 stores the various information elements necessary to determine the VPI/VCI information and the specific port interface on which to transmit cells related to an IP packet. Therefore, as relevant to the embodiment/approach described in the previous section, the information elements representing SWIDB, VC-structure, grouping information, PIDB, etc., may be stored in VC table 335. In addition, various parameters used for forwarding the data in the packets (e.g., for providing different QOS, etc.) may also be stored in VC table 335.

VC determination block 330 determines the VPI/VCI information and the specific port interface on which to forward a received IP (or layer-3, in general) packet. The VPI/VCI and the specific port interface may be determined by accessing the various information elements in VC table 335, as described in the previous section.

Encapsulator 350 receives each IP packet and encapsulates the data in the form of several ATM cells. The header for each cell is constructed based on a VPI/VCI received from VC determination block 330. The same VPI/VCI is used to encapsulate all cells of a packet. Outbound interface 390 transmits the resulting cells on a port interface specified by VC determination block 330.

Rebinding block 360 determines whether condition justifying the move of a virtual circuit to a new port interface has occurred, and moves the virtual circuits assigned to the port interface to a new port interface. To move a virtual circuit, the data elements corresponding to the virtual circuit may be changed in VC table 335. The basis for the changes that may need to be performed is illustrated with an example in the previous section, and the necessary changes may be performed accordingly.

Rebinding block 360 may also determine the specific new port interface to which to move a virtual circuit, for example, as described in sections above. Grouping information in VC tables 335 may be examined to determine the specific port to which the virtual circuit is to be moved.

Discovery block 370 operates to communicate the port interface assignments to adjacent network devices. Thus, when a virtual circuit is assigned to a port interface or when the virtual circuit is moved to a new port interface (which may be indicated by rebinding block 360), discovery block 370 sends the corresponding information (by accessing VC table 335) using encapsulator 350 and outbound interface 390. As noted above, various protocols can be designed to communicate the port interface assignments information.

While the above description relates to forwarding of IP packets, the manner in which the received cells are processed is described below with reference to FIG. 3B.

8. Receiving Cells in Edge Router

Figure 4:
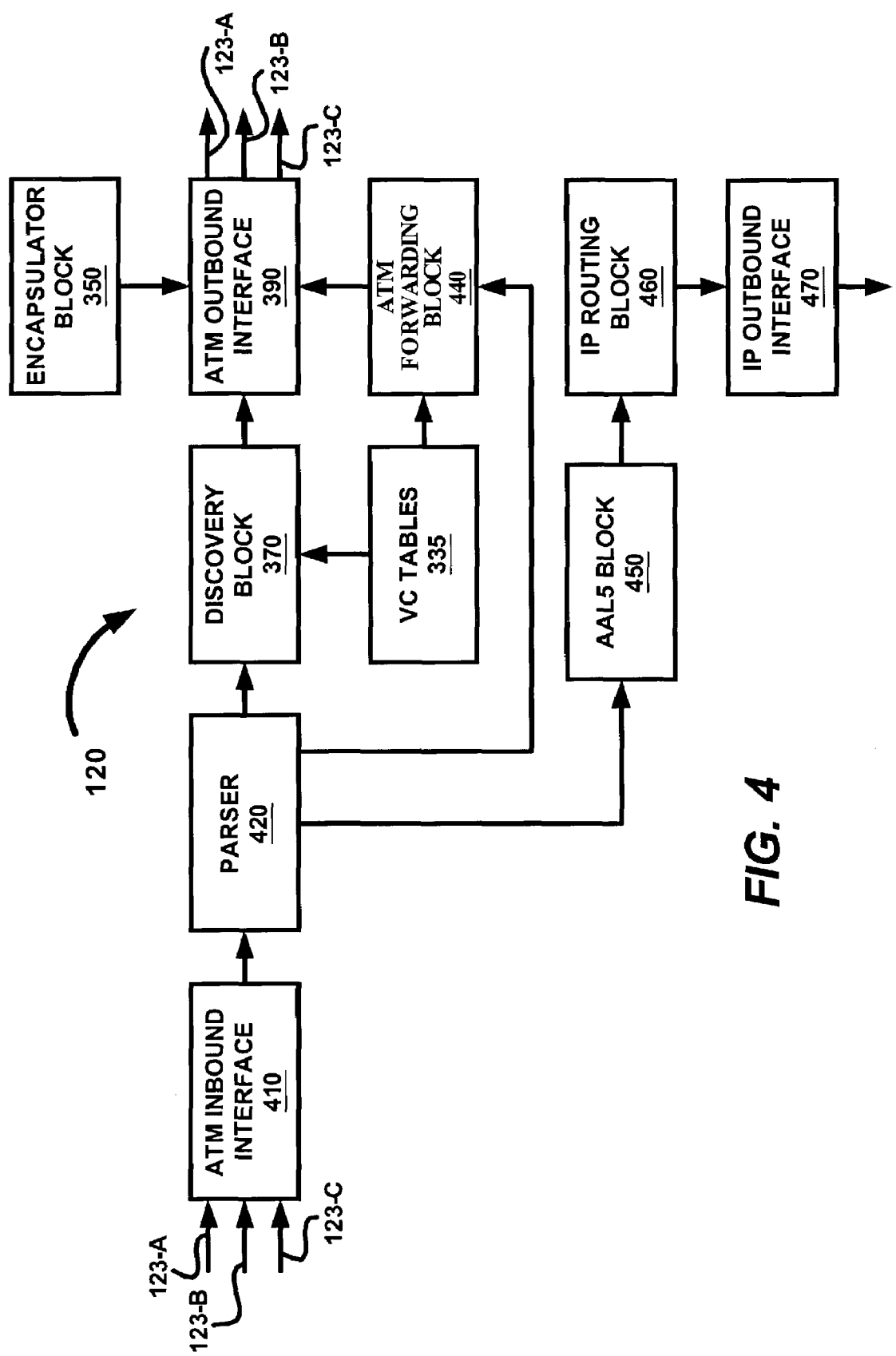
FIG. 4 is a block diagram illustrating further details of an edge router in an embodiment of the present invention.

FIG. 4 is a block diagram illustrating in further detail the manner in which cells may be processed within edge router 120 in an embodiment according to the present invention. FIG. 4 is shown containing ATM inbound interface 410, parser 420, discovery block 370, encapsulator block 350, ATM outbound interface 390, VC tables 335, ATM forwarding block 440, AAL5 block 450, IP routing block 460, and IP outbound interface 470.

As may be readily appreciated, some of the components of FIG. 3 are also included in FIG. 4. Only the differences in operation from FIG. 3, as relevant to reception and processing of cells is described in this section in the interest of conciseness.

ATM inbound interface 410 provides the physical, electrical and other protocol interfaces to receive IP cells on paths/port interfaces 123-A through 123-C. The packets are forwarded to parser 420. ATM inbound interface 410 may be implemented in a known way. VC table 335 may contain information such as whether cells received on a virtual circuit would contain data to be transported as IP packets, etc.

Parser 420 examines each received cell to determine the next block to forward the cell. The determination is made based on the information available in VC table 335. If the cell requires further forwarding on ATM backbone 150, the cell is passed to ATM forwarding block 440. If the cell is received on a virtual circuit which would transport data forming an IP packet, the cell may be passed to AAL5 block 450. If a received cell relates to a discovery protocol (related to communication of information on port interface assignment), the cell is passed to discovery block 370.

Discovery block 370 examines the received cells to determine whether the cells contain a request for information on specific port interface assignments. VC tables 335 are examined for the corresponding information, and a response may be generated. The request and response may be implemented using various protocols as described in the sections above. ATM cells containing the response are forwarded using encapsulator block 350 and ATM outbound interface 390.

ATM forwarding block 440 determines the new VPI/VCI and port interface on which to forward a received cell. The determination may be performed based on information available in VC tables 335. The cell may then be forwarded using ATM outbound interface 390. ATM forwarding block 440 may be implemented in a known way.

AAL5 block 450 receives a sequence of cells together containing an IP packet. The IP packet may be assembled in a known way, and forwarded to IP routing block 460. IP routing block 460 forwards the packet using a destination IP address contained within the IP packet. IP outbound interface 470 may be used for the forwarding. AAL5 block 450 and IP outbound interface 470 may be implemented in a known way.

Accordingly, edge router 120 can be used to receive and transmit packets according to various aspects of the present invention. However, the adjacent switch may also need to be implemented in a cooperating manner. The manner in which cooperating switches can be implemented is described below in further detail.

9. Switch

Figure 5:
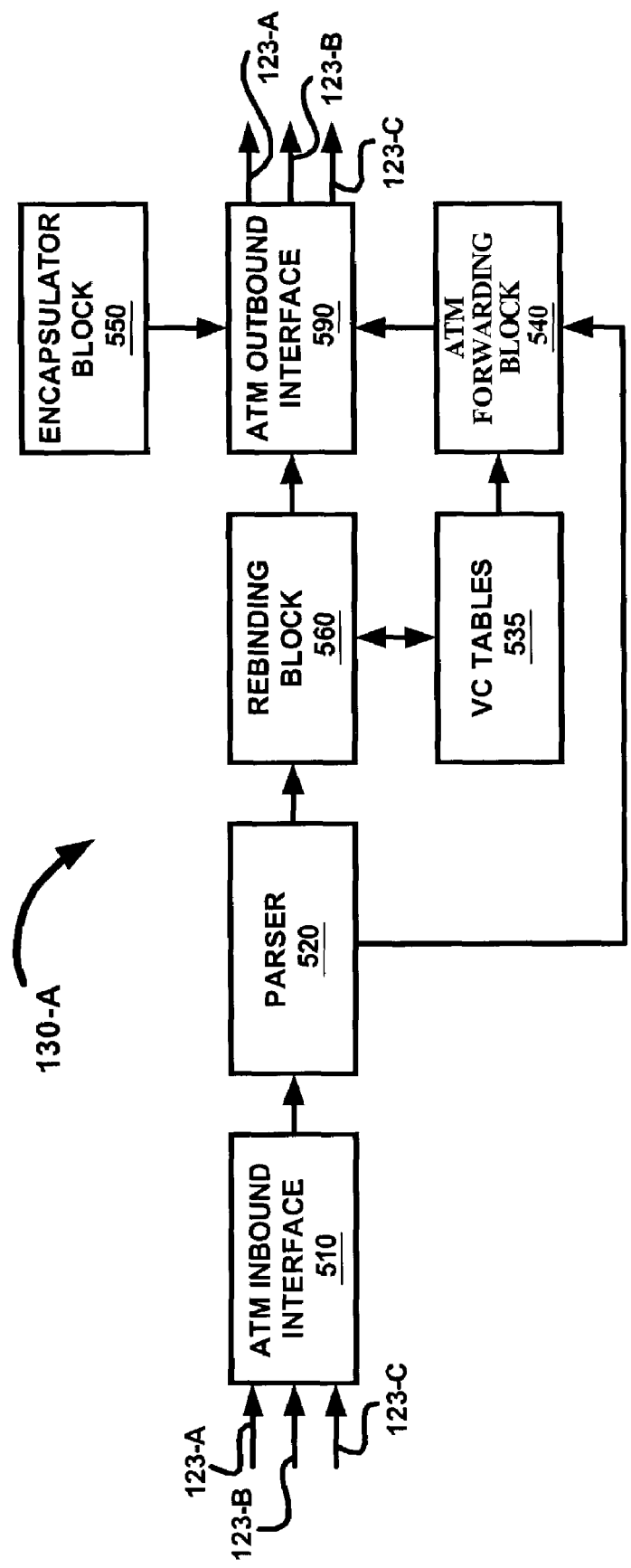
FIG. 5 is a block diagram illustrating the further details of a switch in an embodiment of the present invention.

FIG. 5 is a block diagram containing the details of an embodiment of switch 130-A as relevant to various aspects of the present invention. Switch 130-A is shown containing ATM inbound interface 510, parser 520, rebinding block 560, encapsulator block 550, ATM outbound interface 590, and VC tables 535. Each block is described below in further detail.

ATM inbound interface 510, parser 520, encapsulator block 550, ATM outbound interface 590, and VC tables 535 may respectively be implemented substantially similar to ATM inbound interface 410, parser 420, encapsulator block 350, ATM outbound interface 390, and VC tables 435. The description of these blocks is not repeated in the interest of conciseness.

Rebinding block 560 processes cells containing information on port assignments. As noted above, some of the responses may be received in response to previously sent requests, and some of the responses may be received automatically when edge router 120 assigns or moves a virtual circuit to a port interface. Re-binding block 560 may initiate a request for information on port assignment for the specific virtual circuit (e.g., including a VPI/VCI or other identifier).

As noted above, protocol may be designed to send requests on any one of the ports in a cluster interface.

When information on port movement/assignment is received from edge router 120, the corresponding tables 535 may be updated using the received information. Once updated, the cells on the virtual circuit may be sent and received on the same port interface.

It should be understood that various modifications may be made from the description of above without departing from the scope and spirit of the present invention, as will be apparent to one skilled in the relevant arts by reading the disclosure provided herein. For example, many of the blocks (e.g., port interface) may contain multiple units, dedicated for a separate port for higher performance.

It should be further understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing edge router 120 with a desired mix of hardware, software and/or firmware. An embodiment implemented substantially in software is described below.

10. Software Implementation

Figure 6:
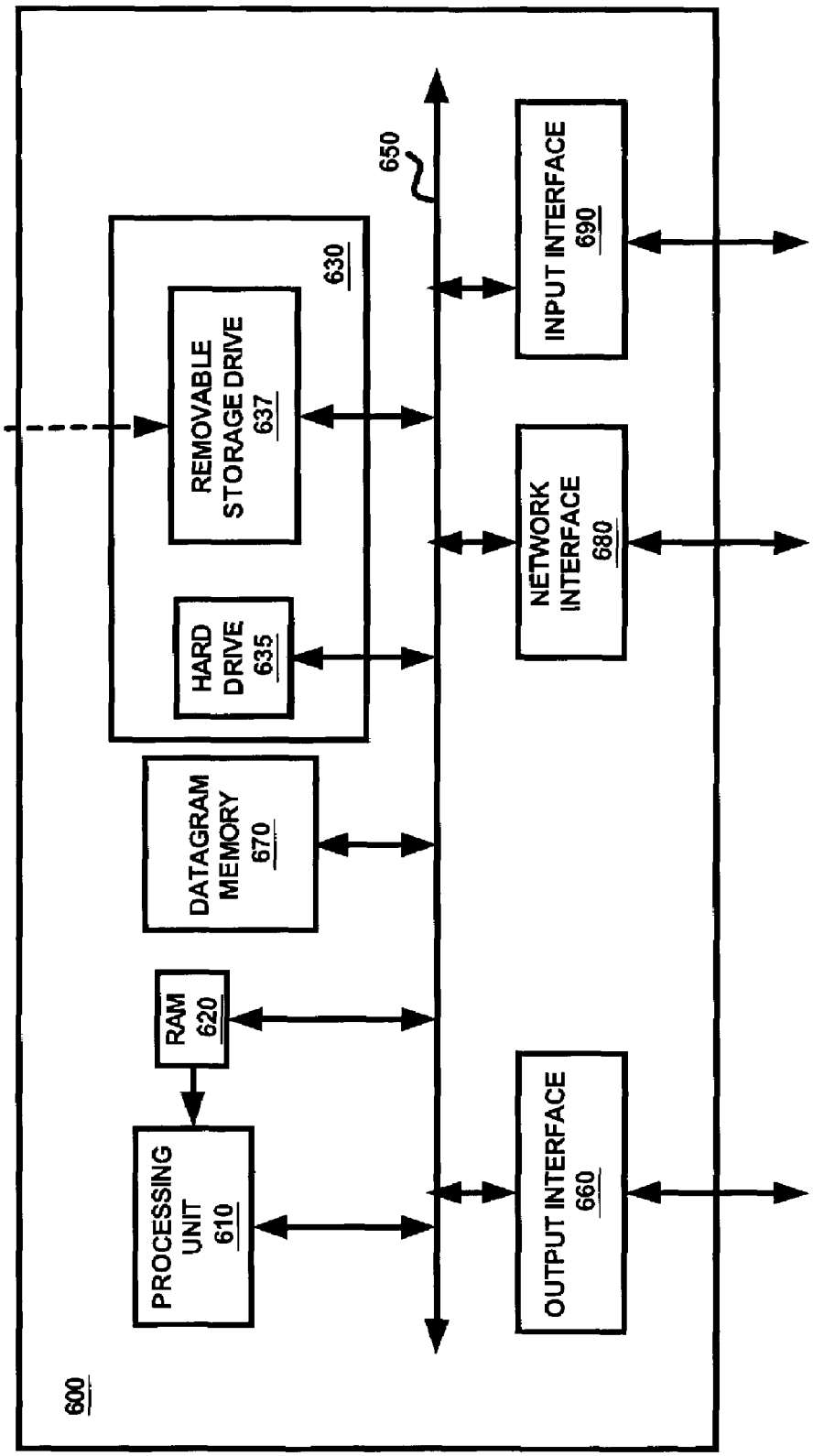
FIG. 6 is a block diagram illustrating the details of an embodiment of a device implemented substantially in the form of software according to an aspect of the present invention.

FIG. 6 is a block diagram illustrating the details of system 600 in one embodiment. System (network device) 600 is shown containing processing unit 610, random access memory (RAM) 620, storage 630, output interface 660, packet memory 670, network interface 680, and input interface 690. Each component is described in further detail below.

Output interface 660 provides output signals (e.g., display signals to a display unit, not shown) which can form the basis for a suitable user interface for an administrator to interact with system 600. Input interface 690 (e.g., interface with a key-board and/or mouse, not shown) enables an administrator to provide any necessary inputs to system 600. Output interface 660 and input interface 690 can be used, for example, to enable a network administrator to specify the specific port interfaces forming a cluster interface.

Network interface 680 enables system 600 to send and receive data on communication networks using asynchronous transfer mode (ATM) and layer-3 protocols (e.g., IP, DECnet, and, Vines protocol well known in the relevant arts) system 600 may be using. Network interface 680, output interface 660 and input interface 690 can be implemented in a known way.

RAM 620, storage 630, and packet memory 670 may together be referred to as a memory. RAM 620 receives instructions and data on path 650 from storage 630, and provides the instructions to processing unit 610 for execution. In addition, RAM 620 may be used to implement the tables and data structures (e.g., VCB) described in the sections above. Thus, in an embodiment implemented in software, the memory is reconfigured to move a virtual circuit from one port interface to another. However, the memory storing the configuration data may be distributed across smaller memory units.

Packet memory 670 stores (queues) cells (potentially IP packets also in case of edge router 120) received and/or waiting to be forwarded (or otherwise processed) on different ports. Secondary memory 630 may contain units such as hard drive 635 and removable storage drive 637. Secondary storage 630 may store the software instructions and data, which enable system 600 to provide several features in accordance with the present invention.

Some or all of the data and instructions may be provided on removable storage unit 640, and the data and instructions may be read and provided by removable storage drive 637 to processing unit 610 via RAM 620. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620. In general processing unit 610 reads sequences of instructions from various types of memory medium (including RAM 620, storage 630 and removable storage unit 640), and executes the instructions to provide various features of the present invention. Such memory medium represents a computer readable storage medium from which processors can read and execute instructions. Thus, embodiments according to FIG. 6 can be used to implement the approaches described above with reference to FIGS. 1-5.

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of transmitting a sequence of cells from a first network device to a second network device, said first network device comprising a plurality of port interfaces, each of said plurality of port interfaces being coupled to a corresponding port interface on said second network device by a corresponding communication path, said method being performed in said first network device, said method comprising:

maintaining a group information indicating that a first port interface and a second port interface are comprised in a cluster interface, said first port interface and said second port interface being comprised in said plurality of port interfaces;

sending a first plurality of cells on a virtual circuit assigned to said first port interface, wherein said first plurality of cells are comprised in said sequence of cells;

examining said group information to determine that said virtual circuit can be moved to said second port interface, wherein said moving is performed based on said examining, moving said virtual circuit from said first port interface to said second port interface based on said examining; and sending a second plurality of cells on said virtual circuit moved to said second port interface, wherein said second plurality of cells are also comprised in said sequence of cells.

2. The method of claim 1, further comprising sending data on one of said plurality of port interfaces indicating that said virtual circuit is moved to said second port interface.

3. The method of claim 2, wherein said data is sent in response to said moving.

4. The method of claim 2, further comprising receiving a request requesting information on a specific port interface to which said virtual circuit is presently assigned, and wherein said sending is performed in response to receiving said request.

5. The method of claim 4, wherein only said first network device, and not said second network device, is permitted to move said virtual circuit, and wherein said second network device sends said request to said first network device.

6. The method of claim 1, wherein said virtual circuit is uniquely identified by a VPI/VCI (virtual path identifier/virtual channel identifier), said method further comprising maintaining said VPI/VCI unique in all virtual circuits assigned to any of said plurality of port interfaces such that all of said sequence of cells are transmitted containing the same VPI/VCI whether transmitted before or after said moving.

7. The method of claim 1, further comprising:
maintaining a plurality of physical information descriptor bases (PIDB), wherein each of said PIDBs is associated with a corresponding one of said plurality of port interfaces; and
maintaining a plurality of VC-structures, wherein said each of said plurality of VC-structures is associated with one of a plurality of virtual circuits provisioned in said cluster interface,
wherein said moving is effected by modifying a VC-structure associated with said virtual circuit to point to a PIDB associated with said second port interface.

8. The method of claim 7, further comprising:
receiving an IP (internet protocol) packet;
examining a forwarding entry using a packet destination address to determine a software IDB (SWIDB), wherein said SWIDB indicates a specific one of said plurality of VC-structures to be used to forward said IP packet; and
sending said IP packet in the form of a third plurality of cells on a port interface indicated by said specific one of said plurality of VC-structures.

9. The method of claim 8, wherein said first network device comprises an edge router and said second network device comprises an asynchronous transfer mode (ATM) switch.

10. The method of claim 1, wherein said first network device comprises a switch, said method further comprises receiving data indicating that said virtual circuit is moved from said first port interface to said second port interface, and wherein said moving is performed in response to receiving said data.

11. The method of claim 10, further comprising sending a request requesting information on a port to which said virtual circuit is assigned, and receiving said data in a response.

12. The method of claim 1, further comprising determining whether said virtual circuit is to be moved to said second port interface to balance load across said first port interface and said second port interface, wherein said moving is performed to balance said load.

13. A first network device transmitting a sequence of cells to a second network device, said first network device comprising:
a first port interface and a second port interface contained in a plurality of port interfaces, wherein each of said plurality of port interfaces is coupled to said second network device by a corresponding communication path;
a memory block storing a configuration data supporting a virtual circuit on said first port interface, wherein a first plurality of cells are sent on said virtual circuit due to said configuration data, wherein said first plurality of cells are comprised in said sequence of cells, wherein said memory block stores a group information indicating that said first port interface and said second port interface are comprised in a cluster interface; and
a rebinding block changing said configuration data to move said virtual circuit to said second port interface, wherein a second plurality of cells are transmitted on said second port interface, wherein said second plurality of cells are also comprised in said sequence of cells, wherein said rebinding block examines said group information to determine that said virtual circuit can be moved to said second port interface, wherein said changing is performed after said examining.

14. The first network device of claim 13, wherein said rebinding block determines whether said first port interface has failed, wherein said changing is performed if said first port interface has failed.

15. The first network device of claim 14, further comprising a discovery block sending data on one of said plurality of port interfaces indicating that said virtual circuit is moved to said second port interface.

16. The first network device of claim 15, wherein said data is sent after said changing.

17. The first network device of claim 15, wherein said discovery block receives a request requesting information on a specific port interface to which said virtual circuit is presently assigned, and wherein said data is sent in response to receiving said request.

18. The first network device of claim 17, wherein only said first network device, and not said second network device, is permitted to move said virtual circuit, and wherein said second network device sends said request to said first network device.

19. The first network device of claim 15, wherein said virtual circuit is uniquely identified by a VPI/VCI (virtual path identifier/virtual channel identifier), and wherein said VPI/VCI is maintained unique in all virtual circuits assigned to any of said plurality of port interfaces such that all of said sequence of cells are transmitted containing the same VPI/VCI whether transmitted before or after said moving.

20. The first network device of claim 13, wherein said memory block stores a plurality of physical information descriptor bases (PIDB), wherein each of said PIDBs is associated with a corresponding one of said plurality of port interfaces, said memory block further storing a plurality of VC-structures, wherein said each of said plurality of VC-structures is associated with one of a plurality of virtual circuits provisioned in said cluster interface, wherein said moving is effected by modifying a VC-structure associated with said virtual circuit to point to a PIDB associated with said second port interface.

21. The first network device of claim 20, further comprising:
an IP inbound interface receiving an IP (internet protocol) packet;
an IP forwarding block examining a forwarding entry using a packet destination address to determine a software IDB (SWIDB), wherein said SWIDB indicates a specific one of said plurality of VC-structures to be used to forward said IP packet; and
an outbound interface sending said IP packet in the form of a third plurality of cells on a port interface indicated by said specific one of said plurality of VC-structures.

22. The invention of claim 21, wherein said first network device comprises an edge router.

23. The invention of claim 13, wherein said first network device comprises a switch, said first network device further comprises a discovery block receiving data indicating that said virtual circuit is moved from said first port interface to said second port interface, and wherein said changing is performed in response to receiving said data.

24. The first network device of claim 23, further comprising a rebinding block sending a request requesting information on a port to which said virtual circuit is assigned, and receiving said data in a response.

25. The first network device of claim 13, wherein said plurality of cells comprise asynchronous transfer mode (ATM) cells, and wherein all of said first plurality of cells and said second plurality of cells are transmitted using a same virtual path identifier/virtual channel identifier (VPI/VCI).

26. A first network device transmitting a sequence of cells to a second network device, said first network device comprising a plurality of port interfaces, each of said plurality of port interfaces being coupled to a corresponding port interface on said second network device by a corresponding communication path, said first network device comprising:
 means for maintaining a group information indicating that a first port interface and a second port interface are comprised in a cluster interface;
 means for sending a first plurality of cells on a virtual circuit assigned to said first port interface, wherein said first plurality of cells are comprised in said sequence of cells, said first port interface being comprised in said plurality of port interfaces;
 means for examining said group information to determine that said virtual circuit can be moved to said second port interface;
 means for moving said virtual circuit from said first port interface to said second port interface based on said examination, wherein said second port interface is comprised in said plurality of port interfaces; and
 means for sending a second plurality of cells on said virtual circuit moved to said second port interface, wherein said second plurality of cells are also comprised in said sequence of cells.

27. The first network device of claim 26, further comprising means for sending data on one of said plurality of port interfaces indicating that said virtual circuit is moved to said second port interface.

28. The first network device of claim 27, further comprising means for receiving a request requesting information on a specific port interface to which said virtual circuit is presently assigned, and wherein said sending is performed in response to receiving said request.

29. The first network device of claim 27, wherein said virtual circuit is uniquely identified by a VPI/VCI (virtual path identifier/virtual channel identifier), said first network device further comprising means for maintaining said VPI/VCI unique in all virtual circuits assigned to any of said plurality of port interfaces such that all of said sequence of cells are transmitted containing the same VPI/VCI whether transmitted before or after said moving.

30. The first network device of claim 26, further comprising:
 means for maintaining a plurality of physical information descriptor bases (PIDB), wherein each of said PIDBs is associated with a corresponding one of said plurality of port interfaces; and
 means for maintaining a plurality of VC-structures, wherein said each of said plurality of VC-structures is associated with one of a plurality of virtual circuits provisioned in said cluster interface,
 wherein said moving is effected by modifying a VC-structure associated with said virtual circuit to point to a PIDB associated with said second port interface.

31. The first network device of claim 30, further comprising:
 means for receiving an IP (internet protocol) packet;
 means for examining a forwarding entry using a packet destination address to determine a software IDB (SWIDB), wherein said SWIDB indicates a specific one of said plurality of VC-structures to be used to forward said IP packet; and
 means for sending said IP packet in the form of a third plurality of cells on a port interface indicated by said specific one of said plurality of VC-structures.

32. A computer readable storage medium storing one or more sequences of instructions for causing a first network device to transmit a sequence of cells from said first network device to a second network device, said first network device comprising a plurality of port interfaces, each of said plurality of port interfaces being coupled to a corresponding port interface on said second network device by a corresponding communication path, wherein execution of said one or more sequences of instructions by one or more processors contained in said first network device causes said one or more processors to perform the actions of:
 maintaining a group information indicating that a first port interface and a second port interface are comprised in a cluster interface;
 sending a first plurality of cells on a virtual circuit assigned to said first port interface, wherein said first plurality of cells are comprised in said sequence of cells, said first port interface being comprised in said plurality of port interfaces;
 examining said group information to determine that said virtual circuit can be moved to said second port interface;
 moving said virtual circuit from said first port interface to said second port interface based on said examining, wherein said second port interface is comprised in said plurality of port interfaces; and
 sending a second plurality of cells on said virtual circuit moved to said second port interface, wherein said second plurality of cells are also comprised in said sequence of cells.

33. The computer readable storage medium of claim 32, further comprising sending data on one of said plurality of port interfaces indicating that said virtual circuit is moved to said second port interface.

34. The computer readable storage medium of claim 33, wherein said data is sent in response to said moving.

35. The computer readable storage medium of claim 33, further comprising receiving a request requesting information on a specific port interface to which said virtual circuit is presently assigned, and wherein said sending is performed in response to receiving said request.

36. The computer readable storage medium of claim 35, wherein only said first network device, and not said second network device, is permitted to move said virtual circuit, and wherein said second network device sends said request to said first network device.

37. The computer readable storage medium of claim 32, wherein said virtual circuit is uniquely identified by a VPI/VCI (virtual path identifier/virtual channel identifier), further comprising maintaining said VPI/VCI unique in all virtual circuits assigned to any of said plurality of port interfaces such that all of said sequence of cells are transmitted containing the same VPI/VCI whether transmitted before or after said moving.

38. The computer readable storage medium of claim 32, further comprising:
   maintaining a plurality of physical information descriptor bases (PIDB), wherein each of said PIDBs is associated with a corresponding one of said plurality of port interfaces; and
   maintaining a plurality of VC-structures, wherein said each of said plurality of VC-structures is associated with one of a plurality of virtual circuits provisioned in said cluster interface,
   wherein said moving is effected by modifying a VC-structure associated with said virtual circuit to point to a PIDB associated with said second port interface.

39. The computer readable storage medium of claim 38, further comprising:
   receiving an IP (internet protocol) packet;
   examining a forwarding entry using a packet destination address to determine a software IDB (SWIDB), wherein said SWIDB indicates a specific one of said plurality of VC-structures to be used to forward said IP packet; and
   sending said IP packet in the form of a third plurality of cells on a port interface indicated by said specific one of said plurality of VC-structures.

40. The computer readable storage medium of claim 39, wherein said first network device comprises an edge router and said second network device comprises an asynchronous transfer mode (ATM) switch.

41. The computer readable storage medium of claim 32, wherein said plurality of cells comprise asynchronous transfer mode (ATM) cells, and wherein all of said first plurality of cells and said second plurality of cells are transmitted using a same virtual path identifier/virtual channel identifier (VPI/VCI).

42. The computer readable storage medium of claim 32, wherein said first network device comprises a switch, further comprises receiving data indicating that said virtual circuit is moved from said first port interface to said second port interface, and wherein said moving is performed in response to receiving said data.

43. The computer readable storage medium of claim 42, further comprising sending a request requesting information on a port to which said virtual circuit is assigned, and receiving said data in a response.

44. The computer readable storage medium of claim 32, further comprising determining whether said first port interface has failed, wherein said moving is performed if said first port interface has failed.

45. The computer readable storage medium of claim 32, further comprising determining whether said virtual circuit is to be moved to said second port interface to balance load across said first port interface and said second port interface, wherein said moving is performed to balance said load.

* * * * *

UNITED STATES PATENT AND TRADEMARK OFFICE
CERTIFICATE OF CORRECTION

PATENT NO. : 7,602,717 B1
APPLICATION NO. : 10/310029
DATED : October 13, 2009
INVENTOR(S) : Shenoy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2017 days.

Signed and Sealed this

Fifth Day of October, 2010

David J. Kappos
*Director of the United States Patent and Trademark Office*